Aug. 17, 1954

F. C. BURRELL 2,686,691

DRIP MOLDING FOR VEHICLE TOPS

Filed July 21, 1953

Inventor
FRANK C. BURRELL
By
Attorney

Patented Aug. 17, 1954

2,686,691

UNITED STATES PATENT OFFICE 2,686,691

DRIP MOLDING FOR VEHICLE TOPS

Frank C. Burrell, Detroit, Mich.

Application July 21, 1953, Serial No. 369,328

3 Claims. (Cl. 296—107)

This invention relates to an attachment for flexible vehicle tops of the type which may be raised or lowered by a collapsible and extensible supporting framework.

The invention has particular reference to a drip molding adapted to be attached to the beaded side edge of a flexible vehicle top so as to prevent the accumulation of drops of water at such edges of the top and to prevent water from dripping from the edges of the top onto the side windows or into the interior of the vehicle when the side windows are open, as now frequently occurs in vehicles of the convertible type.

The principal object of the invention is to provide a new and improved drip molding for a convertible vehicle.

Another object of the invention is to provide a drip molding for a vehicle top comprising a strip of flexible material having a drip trough formed therein and attaching means integral therewith.

Other and further objects of the invention will be apparent from the following description and claims and may be understood by reference to the accompanying drawings, of which there is 1 sheet, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 5 is a perspective view of a portion of a reinforcing means adapted for use with the drip molding.

Figure 1:
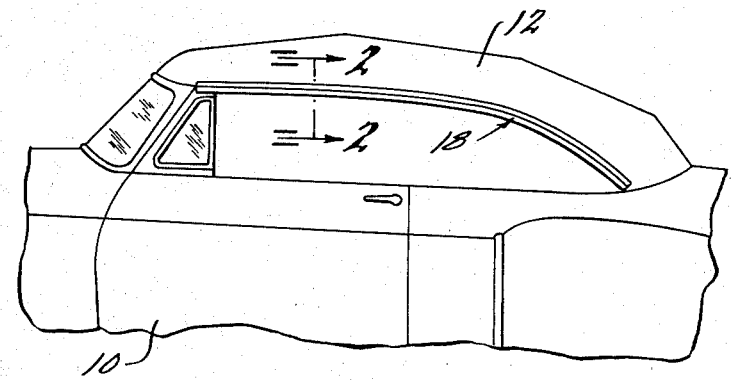
Fig. 1 is a side elevational view of a vehicle having a flexible top with the drip molding of this invention applied thereto.
Figure 2:
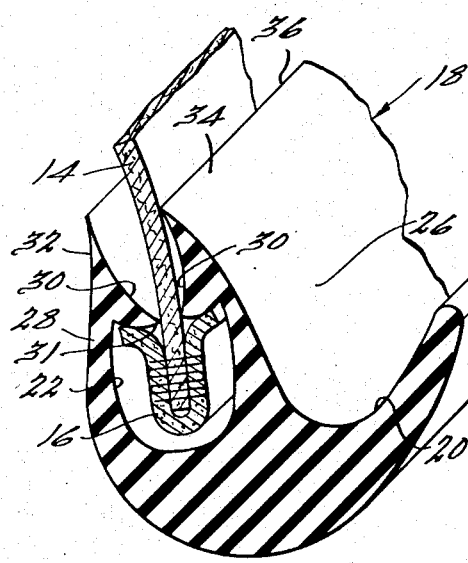
Fig. 2 is an enlarged fragmentary perspective view of the drip molding and showing the same attached to the beaded edge of the vehicle top.

Referring more particularly to the drawings, in Fig. 1 there is disclosed an automotive vehicle 10 having a flexible top 12 adapted to be raised or lowered by suitable power operated linkages, not shown. The side edges 14 of the flexible top 12 are customarily provided with trim strips or beads 16 which may be sewn or otherwise secured to the top. The drip molding 18 is adapted to be secured to the downwardly turned side edges 14 of the top and may comprise an extruded or molded strip of rubber or plastic or other suitable material. The strip 18 may be formed substantially as shown in Fig. 2 to provide a trough portion 20 at one side thereof and a bead receiving channel 22 extending parallel to and at one side of the drip trough 20.

The trough 20 is open at its rear end and is defined between an outer wall 24 and a wall 26, the latter wall also forming one wall of the channel 22. The wall 26, and the other wall 28 of the channel 22, are each provided with barb portions 30 which are spaced apart so as to define a longitudinal slot 31 defining the opening into the channel 22. The barb portions 30 are spaced apart a distance less than the width of the bead 16 provided on the side edges of the flexible top of the vehicle, and the walls 26 and 28 defining the channel 22 may be sprung apart due to the resilient nature of the material of which the strip is made so as to permit entry of the bead 16 into the channel 22.

The barb portions 30 of the strip may engage the top material above the bead 16 after the bead has been inserted into the channel, and the barbs engage the upper edges of the bead 16 to detachably retain the strip 18 in the position shown.

The wall 28 of the strip 18 has its upper end 32 extending above the barb portion 30 and such upper end 32 will be disposed between the downwardly turned side edge 14 of the top and the joint between the vehicle windows and the framework of the top when the strip is attached to the top, thus tending to prevent any water which might soak through the outer edges of the top from entering the window openings.

The upper end 34 of the wall 26 may be formed in the manner shown in the drawings so that the upper edge 36 thereof will sealingly engage the outer edge of the top material above the bead 16, substantially preventing water from flowing off the top into the bead receiving channel 22 and directing water into trough 20 from which it is discharged rearwardly of the side windows of the vehicle.

Figure 3:
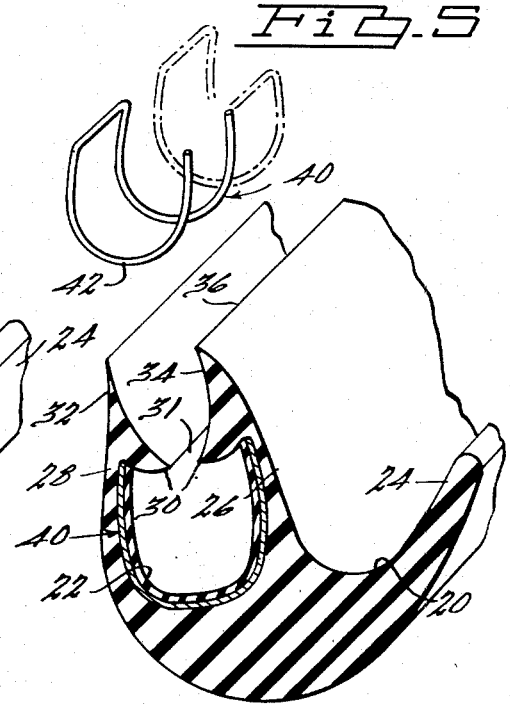
Fig. 3 is an enlarged fragmentary perspective view of a modified form of drip molding.
Figure 4:
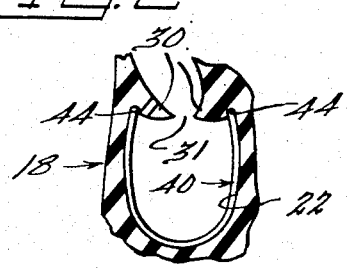
Fig. 4 is a fragmentary sectional view of a further modification of the invention.

In Fig. 3 the drip molding is formed substantially as described in connection with Fig. 2, except that a reinforcing means 40 is provided which may resiliently urge the barb portions 30 toward each other, and which reinforcing means also tends to maintain the strip 18 in its original shape and to prevent deforming or distortion of the strip due to bending thereof as the top 12 is raised and lowered. The reinforcing means 40 may comprise a plurality of individual wires 42 each shaped as shown in solid lines in Fig. 5 and spaced along the length of the bead receiving channel 22, or the reinforcing means 40 may comprise a single wire extending throughout the length of the channel as indicated by the dot-dash lines of Fig. 5. The reinforcement shown in Fig. 3 is adapted to be molded into the resilient strip 18, while the reinforcing wires shown in Fig. 4 are laid in the channel 22 with their upper ends 44 disposed in longitudinal notches or grooves formed in the strip 18. In this modification, as in the modification in Fig. 3, the reinforcing means 40 may comprise a single wire extending throughout the length of the channel 22 or a plurality of independent sections 42 of the type shown in Fig. 5. In either case the reinforcing means will not materially interfere with the necessary folding of the strip molding as the top is raised and lowered.

While I have illustrated and described preferred embodiments of my invention, it is understood that these are capable of modification and I therefore do not wish to be limited to the precise details set forth but desire to avail myself of such changes and alterations as fall within the purview of the following claims.

I claim:

1. A drip molding adapted to be attached to the beaded side edge of a flexible vehicle top, comprising a strip of resilient material having a longitudinal trough formed therein and a bead-receiving channel disposed parallel to and at one side of said trough, and barb portions defining the opening into said channel through which the bead may be inserted, said barb being spaced apart a distance less than the width of the bead.

2. A drip molding according to claim 1 including a flexible reinforcing means extending along the length of the strip for biasing said barb portions toward each other.

3. A drip molding according to claim 1 wherein said strip is formed to provide a sealing edge engageable with the outer side of the top material above the bead.

References Cited in the file of this patent

UNITED STATES PATENTS

| Number | Name | Date |
| --- | --- | --- |
| 2,039,203 | Billman | Apr. 28, 1936 |
| 2,544,580 | Blanchet | Mar. 6, 1951 |

FOREIGN PATENTS

| Number | Country | Date |
| --- | --- | --- |
| 360,762 | Great Britain | Nov. 12, 1931 |